United States Patent Office 3,187,056
Patented June 1, 1965

3,187,056
PROCESS FOR THE PRODUCTION OF OCTAFLUOROCYCLOBUTANE
John Colin Tatlow and Paul Leslie Coe, Birmingham, England, assignors to The National Smelting Company Limited, London, England
No Drawing. Filed Mar. 29, 1962, Ser. No. 183,400
Claims priority, application Great Britain, Apr. 11, 1961, 13,035/61
1 Claim. (Cl. 260—648)

This invention relates to the preparation of octafluorocyclobutane,

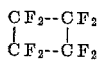

a known substance which finds commercial application as a stable propellant in aerosols for use in foodstuffs e.g. cream, salad cream, etc.

The invention consists in a method for the preparation of octafluorocyclobutane by dechlorination of sym-dichlorotetrafluoroethane. Conveniently, the dechlorination is carried out by pyrolysis, which may be carried out in the presence of nickel gauze or iron turnings.

The invention further consists in a method for the preparation of octafluorocyclobutane comprising the steps of passing $CF_2ClCF_2Cl$ vapour over nickel gauze at a temperature of between 450° and 700° C. and purifying the products obtained by means of distillation. The nickel gauze used is contained in a pyrolysis tube, and optionally may be conditioned before use by passage of, for example, octafluorocyclohexadiene.

The invention will be further described with reference to the following non-limiting examples.

Example 1

8.9 g. of $CF_2ClCF_2Cl$ were vapourised and passed at a flow rate of 1.6 litres/hour over nickel gauze in a pyrolysis tube held at 590°. However, only two grammes of a mixture of octafluorocyclobutane and tetrafluoroethylene were produced together with 2.6 g. of starting material. It was apparent that conditions in the pyrolysis tube had not stabilised, and accordingly three pyrolysis runs were carried out at about the same temperature using $C_6F_8$ until consistent results were obtained. The original pyrolysis was then repeated, using this time 4.1 gms. of starting material at the same flow rate but at a slightly higher temperature (610° C.) 2.1 grammes of octafluorocyclobutane and 0.6 gramme of tetrafluoroethylene were produced, a yield of the cyclic compound of about 84% of theoretical.

Example 2

7.5 g. of $CF_2ClCF_2Cl$ were pyrolysed in the pyrolysis tube of Example 1 after it had been treated by $C_6F_8$ pyrolysis, carried out therein at a flow rate of 1.6 litres/hour and a temperature of 680° C. 2.3 g. of octafluorocyclobutane and 1.0 of the tetrafluoroethylene were prepared, a yield of over 50% of the cyclic compound.

Octafluorocyclobutane is a gas at atmospheric pressure, boiling at —6.1° C. and freezing at —41.4° C. It is inert to a wide range of chemical reactants, being unaffected by refluxing with dilute or concentrated mineral acids or alkalies, oxidising agents or strong reducing agents. Such a lack of reactivity towards chemical reagents, coupled with the fact that it is non-toxic and non-inflammable, make octafluorocyclobutane uniquely suited for industrial-scale use as a propellant for food products packaged in aerosol or pressure-pack form. For such applications, the United States Food and Drug Administration requires that the formulation shall not develop more than 1 p.p.m. fluoride ion upon storage for one year, and octafluorocyclobutane is the only fluorine-containing propellent to have received F.D.A. approval for this purpose.

In addition to its value as a propellent for foodstuffs dispensed in aerosol form, octafluorocyclobutane has outstanding properties as a gaseous dielectric medium, its use permitting the design and use of safer and more compact items of electrical equipment, such as transformers and high-voltage electrical conductors, or alternatively, its use allows increased electrical loadings to be handled with safety. Octafluorocyclobutane may also be expected to find application as a stable, non-flammable, non-toxic heat-transfer medium.

Widespread industrial utilization of octa-fluorocyclobutane may therefore be expected and these will be facilitated by the present invention which comprises a new and more economic route for the preparation of the compound from readily accessible starting materials. Prior art methods for the preparation of octafluorocyclobutane depend upon the thermal dimerisation of tetrafluoroethylene. These methods are expensive to carry out since they require an expensive starting material, tetrafluoroethylene, and the use of specialised pressure equipment. The present process provides an efficient means for the production of octafluorocyclobutane from the readily-available sym-dichlorotetrafluoroethane in simple and cheap equipment.

We claim:

A process for the production of octafluorocyclobutane comprising the steps of: packing a tube with nickel gauze; passing octafluorocyclohexadiene vapour through the packed tube at a temperature within the range 450° C.– 700° C. to precondition the gauze and interior surface of the tube; and passing symmetrical dichlorotetrafluoroethane through the tube at a temperature within the range 450° C.–700° C.

References Cited by the Examiner
UNITED STATES PATENTS

| | | | |
|---|---|---|---|
| 2,404,374 | 7/46 | Harman | 260—648 |
| 2,551,573 | 5/51 | Downing et al. | 260—648 |
| 2,615,925 | 10/52 | Bordner | 260—648 |
| 2,697,124 | 12/54 | Mantell | 260—653.5 |
| 2,709,189 | 5/55 | Farlow et al. | 260—653.3 |
| 2,999,885 | 9/61 | Heberling | 260—648 |

OTHER REFERENCES

Bidinoste et al.: J.A.C.S., vol. 83, 3737-43 (1961).
Gething et al.: Nature, vol. 183, pp. 586-7 (1959).

LEON ZITVER, *Primary Examiner.*